United States Patent [19]
Arai

[11] 3,904,283
[45] Sept. 9, 1975

[54] CARTRIDGE-TYPE AUDIO-VISUAL PROJECTOR

[75] Inventor: Kiyoyuki Arai, Tokyo, Japan

[73] Assignee: Kabushiki Kaisha Koparu, Tokyo, Japan

[22] Filed: Sept. 21, 1973

[21] Appl. No.: 399,520

[30] Foreign Application Priority Data
Sept. 22, 1972 Japan.............................. 47-95449

[52] U.S. Cl. .................... 352/72; 352/10; 352/104
[51] Int. Cl.² ........................................ G03B 23/02
[58] Field of Search ................ 352/72, 104, 129, 10

[56] References Cited
UNITED STATES PATENTS
2,022,903   12/1935   Thomas .......................... 352/104
3,025,750   3/1962    Polan ................................ 352/10
3,025,750   3/1962    Polan ............................. 352/72 X
3,138,057   6/1964    Castedello .................... 352/129 X Primary Examiner—Monroe H. Hayes
Attorney, Agent, or Firm—Cushman, Darby & Cushman

[57] ABSTRACT

The present invention relates to an audio-visual projector arranged so as to be able to reproduce the sound recorded on the film when a film cartridge is set to the predetermined position, and due to its built-in selection system comprised of a magnetic reproducing means and an optical reproducing means, it is possible to use either a magnetic sound film or an optical sound film. The present audio-visual projector can project a picture on a screen built in the projector or on a screen placed outside the projector.

4 Claims, 11 Drawing Figures

PATENTED SEP 9 1975   3,904,283

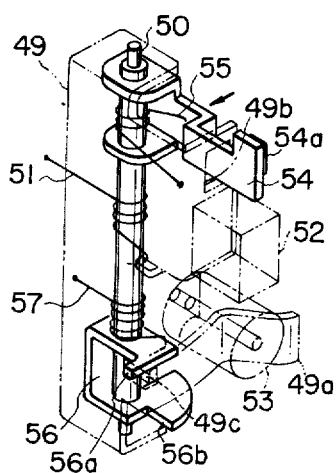
FIG. 5
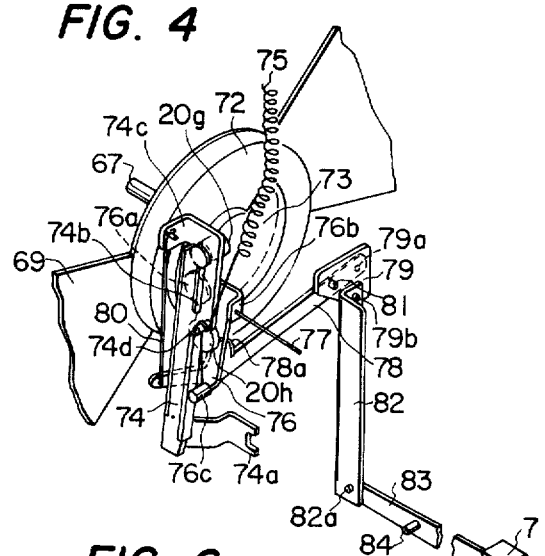
FIG. 4
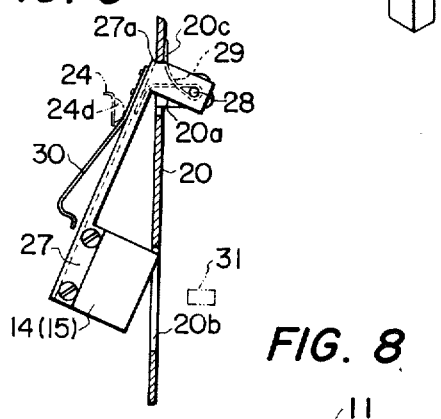
FIG. 6
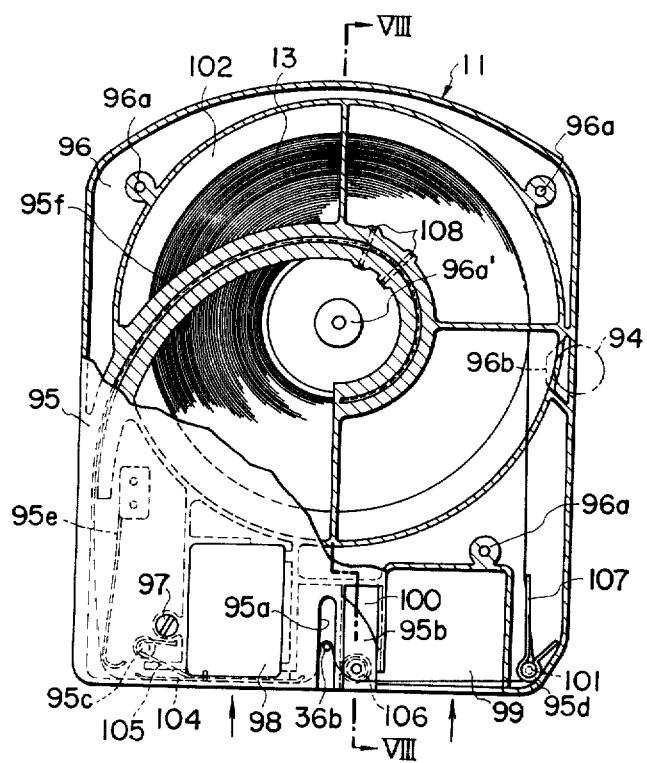
FIG. 7
FIG. 8

CARTRIDGE-TYPE AUDIO-VISUAL PROJECTOR

BACKGROUND OF THE INVENTION

1. Field of the invention

The present invention relates to an audio-visual projector using a film cartridge and being equipped with optical and magnetic reproducing means which can reproduce the sound on a part of the film.

1. Description of the prior art

The previous well-known audio-visual projector using a film cartidge is equipped with only optical reproducing means or magnetic reproducing means to reproduce the sound recorded on the film. For this reason, the audio-visual projector equipped with the optical reproducing means can only use the optical sound film, and that equipped with magnetic reproducing means can only use the magnetic sound film. In general, the film cartridge in the market uses optical sound film, but when an amateur complies a film it is ordinary to record a sound magnetically. Accordingly, it is required in some instances to have two units of audio-visual projector, one equipped with optical reproducing means and the other with magnetic reproducing means. This obliges a user to purchase two expensive projectors.

SUMMARY OF THE INVENTION

The primary object of the present invention is to provide an audiovisual projector equipped with optical sound reproducing means and magnetic sound reproducing means, one of which is moved to its working position in accordance with the sound recording system of the film cartridge to be used.

Another object of the present invention is to provide an audiovisual projector so arranged as to be able to project a picture on a built-in screen or on a screen placed outside the projector by a rotatable reflecting mirror.

Still another object of the present invention is to provide a film cartridge smoothly adaptable to the present audio-visual projector These and other objects as well as the advantages of the present invention will become apparent by reading the description of an embodiment of the invention when taken in conjunction with the accompanying drawings.

BRIEF DESCRIPTION OF THE DRAWINGS

FIG. 4 shows an enlarged perspective view illustrating film feeding means;

FIG. 5 shows an enlarged perspective view illustrating a sound reproducing means;

FIG. 6 shows a sectional view along the line VI—VI of FIG. 3;

FIG. 7 shows a front view partially broken illustrating a film cartridge;

FIG. 8 shows a sectional view along the line VIII—VIII of FIG. 7;

DESCRIPTION OF THE PREFERRED EMBODIMENT

Figure 1:
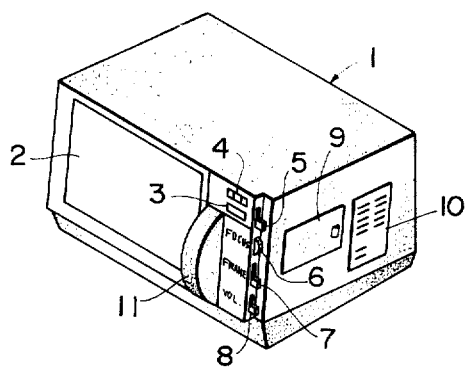
FIG. 1 shows a perspective view illustrating an embodiment of an audio-visual projector according to the present invention.
Figure 2:
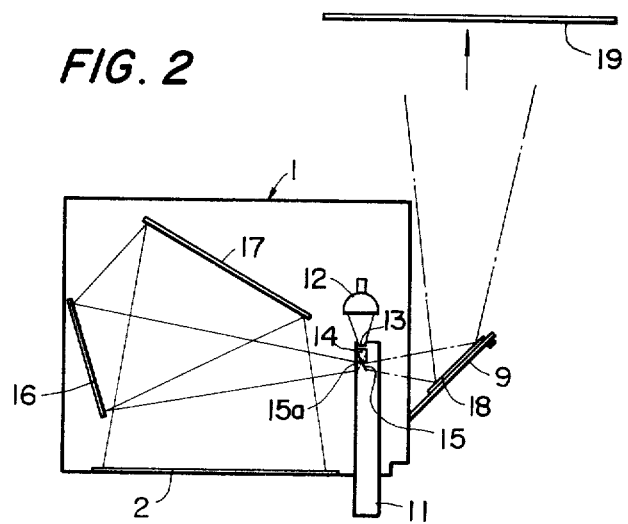
FIG. 2 shows an explanatory view illustrating a lens system and a passing ray of the projecting light.

Referring to FIGS. 1 and 2, reference numeral 1 represents a body case of a projector according to the present invention, numeral 2 represents a screen, numeral 3 represents an indicating aperture for a pilot lamp which shows the projector being switched on, numeral 4 represents an indicating aperture for a lamp which shows the projector being in operation, numeral 5 represents an operating knob adapted to be manually moved up-and-downwards, numeral 6 represents a rotatable focusing knob, numerals 7 and 8 represent a film-frame adjusting knob adapted to be manually moved up-and-downwards and a volume adjusting knob, respectively, numeral 9 represents a door located at a side wall of the body case 1 and being adapted to be opened and closed, numeral 10 represents a detachable vent plate, numeral 11 represents a drawable film cartridge being set in the body case 1, numeral 12 represents a projecting lamp, numeral 13 represents a film to be projected, numeral 14 represents a lens block, numeral 15 represents a reflecting mirror being contained in the lens block 14 and rotatable along with a shaft 15$a$, numeral 16, 17 represent reflecting mirrors being fixed in the body case 1, numeral 18 represents a reflecting mirror being fixed inside the door 9, numeral 19 represents an external screen being sited apart from the body case 1.

Figure 3:
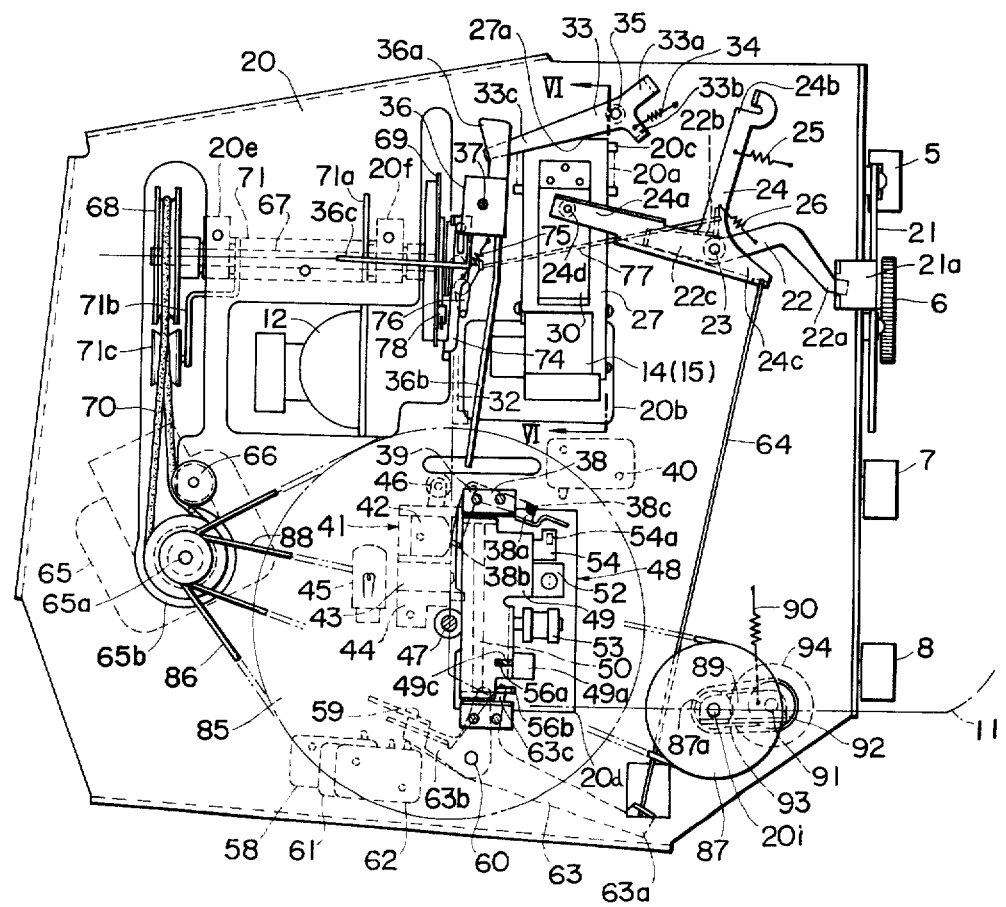
FIG. 3 shows a side elevational view illustrating the important part of the inside mechanism.

Referring to FIG. 3 and 4, reference numeral 20 represents a base plate being secured to the body case 1, numeral 21 represents an operation board which moves up and down against the base plate 20 along with the motion of the operating knob 5 and in part of which forked portion 21$a$ is formed, numeral 22 represents an operating lever having arms 22$a$, 22$b$ and 22$c$ and being rotatably supported by a shaft 23 fixed on the base plate 20. The arm 22$a$ engages with the forked portion 21$a$, and in the other arms 22$b$, 22$c$, a bent portion is formed, respectively, numeral 24 represents an interlocking lever having arms 24$a$, 24$b$, 24$c$ in each of which bent portions are also formed, and being rotatably supported by the shaft 23 with the nature of clockwise rotation by the spring 25. Between the levers 22 and 24, a spring 26 is provided so that the bent portion of the arm 22$c$ engages to the bent portion of the arm 24$a$. Numeral 24$d$ represents a pin being fixed at the end of the arm 24$a$ of the lever 24. Numeral 27 represents a lens block fixing plate (refer to the FIG. 6) just fixing a lens block 14 on its free end portion in which the reflecting mirror 15 being rotatable around a shaft 15$a$ perpendicular to a not shown optical axis is contained, and being rotatably supported with the nature of clockwise rotation by a spring 29 on a shaft 28 which is supported by bearing 20$a$ of the base plate 20, and making it possible to execute an in-and-out motion through a hole 20$b$ formed in the base plate 20 and the clockwise rotation is stopped when a stopping portion 27$a$ engages to the edge of a hole 20$c$ made in the base plate 20. Numeral 30 represents a plate spring, one side of which is fixed at the fixing plate 27 and the other free end is slanted so as to be apart from the fixing plate 27 supporting the lens block 14, and engaging with the pin 24d of the interlocking lever 24. Numeral 31 represents an aperture formed in a gate plate 32 which is fixed at the base plate 20. Numeral 33 represents a lock lever having arms 33a, 33b, 33c the tip of each of which is bent, and being rotatably supported by a shaft 35 of the base plate 20 with the nature of counter-clockwise rotation by a spring 34. Numeral 36 represents a detecting member of the film loop having a cam plate 36a, a detecting element 36b, an arm 36c, and being rotatably supported by a shaft 37 of the base plate 20. The bent portion of the arm 33c of the lock lever 33 is engageable with the cam plate 36a. Numeral 38 represents a change-over lever having arms 38a, 38b, in the former of which a detecting pin 38c is fixed, and being rotatably supported with the nature of counter-clockwise rotation through a not shown spring by the shaft 39 being fixed at the base plate 20, and the counter-clockwise rotation is adapted to be stopped at the position shown in FIG. 3 by a not shown stopper. Numeral 40 represents a micro-switch which is used as a change-over switch for the circuit of both sound systems, and its pin plunger is adapted to engage with the arm 38a of the change-over lever 38. Numeral 41 represents a magnetic and optical sound reproducing device, numeral 42 represents a magnetic head, numeral 43 represents a lens system, all of which are fixed on the base plate 20 through a supporting member 44. Numeral 45 represents a exciter lamp being set so as to coincide with the optical axis of the lens system 43, numeral 46 represents a pressure roller having a nature of clockwise rotation against the supporting member 44 by a not shown spring, numeral 47 represents a capstan.

Numeral 48, as fully shown in FIG. 5, represents a sound reproducing means, numeral 49 represents a supporting base plate being rotatably supported by a shaft 50 which is supported by the base plate 20 with the nature of clockwise rotation by a spring 51 (refer to the FIG. 5), numeral 49a represents an arm of the supporting base plate 49 being projected in the passage of the body case 1 in which the cartridge is inserted so that it can be engaged with the cartridge 11. Numeral 52 represents a photoelectric converting element being fixed to the supporting base plate 49 so that its receiving surface is coincided with the optical axis of the lens system 44. Numeral 53 represents a pinch roller being rotatably supported on the supporting base plate 49. Numeral 54 represents a pad supporting plate having a pad 54a and being given the nature of counter-clockwise rotation by a spring 55 and being movable within the range of a hole 49b formed in the supporting base plate 49. To the middle part of the supporting plate 54 (arrow part of FIG. 5), the arm 38b of the change-over lever 38 engages, and when pushed to the arrow direction, the supporting plate 54 moves round the direction against the nature of the spring 55. Numeral 56 represents a pressure plate having a projection 56a and an engaging portion 56b, and being given the nature of clockwise rotation (FIG. 5) by a spring 57, and being movable in the hole 49c of the supporting base plate 49 within the range of the moving capacity of the projection 56a. The sound reproducing means 48 is arranged so as to be able to rotate by 90° around the shaft 50 through a hole 20d of the base plate 20 from the position shown in FIG. 3, viz., it is rotatable to the orthoganal position to the paper surface in the FIG. 3. Numeral 58 represents a power source switch, numeral 59 represents an operating lever for the power source switch 58 being rotatably supported with the nature of clockwise rotation by a not shown spring on a shaft 60 fixed at the base plate 20, and the one arm is engaged with the cartridge 11 when it is set, and the other arm is engageable with the power source switch 58. Numeral 61 represents a motor switch, numeral 62 represents a change-over switch for lamp circuits, numeral 63 represents an operating lever having arms 63a, 63b, 63c and being rotatably supported by the shaft 60. The tip of the arm 63a of the lever 63 has a bent portion which is interconnected with the bent portion of the arm 24c of the interlocking lever 24 by a interconnecting wire 64. The tip of the arm 63b is engageable with the motor switch 61 and the change-over switch 62, and the tip of the arm 63c engages with the engaging portion 56b of pressure plate 56 when the sound reproducing means 48 is rotated from the position of FIG. 3 to the reproducing device 41 by 90°. Numeral 65 represents a motor having a shaft 65a and a pully 65b being fixed on the shaft 65a, numeral 66 represents a guide roller, numeral 67 represents a shutter shaft being rotatably supported by bearings 20e and 20f which are fixed on the baseplate 20. Numerals 68 and 69 represent a pulley and a shutter blade each being oppositely fixed at the both edges of the shaft 67, Numeral 70 represents a belt passing over the pulleys 65b, 68 and the guide roller 66, numeral 71 represents a speed control member being rotatably supported on the shutter shaft 67 and being given the nature of counter-clockwise rotation by a not shown spring and having end portions, arms 71a and 71b. The arm 71a engages with the arm 36c of the loop detecting member 36, and the arm 71b has a pulley 71c being engaged with the belt 70. As fully shown in FIG. 4 as a film feeding claw means, numerals 72 and 73 represent a well known film feeding control cam being fixed on the shutter shaft 67, numeral 74 represents a feeding claw member forming a claw 74a in one end and having a slot 74b and a bent portion 74c in the other end, and further having a pin 74d in its central portion, and being movably supported by engaging the slot 74b to a pin 20g which is fixed on the base plate 20. The claw member 74 is given the nature to deviate counter-clockwise direction and upwards against the pin 20g by a spring 75 being positioned between the pin 74d and the base plate 20. Numeral 76 represents an operating plate having three arms and a cam follower 76a, a bent portion 76b, a pin 76c, and being rotatably supported by a pin 20h which is fixed on the base plate 20. The cam follower 76a contacts to the cam 73, and the bent portion 76b and the bent portion of the arm 22b of the operating lever 22 are interconnected by a wire 77, and the pin 76c contacts to a side face of the claw member 74 and operates the claw 74a to make forward or backward motion against the film not shown. Numeral 78 represents a feeding plate, and one end of it is rotatably supported by a shaft 79a being fixed on one of the top portions of an intermediate plate 79 being in triangle form, and the free end of it is interconnected with the other end of an interconnecting wire 80 which is positioned over the bent portion 74c of the claw member 74 through one end of it, and in the central part cam inverted portion 78a is fixed. A cam following portion 78a contacts to the feeding cam 72 and operates for the claw 74a to make up and down motion in accordance with the motion of the cam 72 and through the wire 80. The other top portion of the intermediate plate 79 is rotatably supported by a shaft 81 being fixed on a not shown fixing member which is fixed on the base plate 20, and on the remaining top portion a pin 79b is fixed. Numeral 82 represents an interlocking rod and one end of it is rotatably supported by a pin 79b of the intermediate plate 79, and the other end has a pin 82a. Numeral 83 represents a flame control lever being rotatably supported by a shaft 84 being fixed on a not shown fixing member which is fixed on the base plate 20, and its one end supports the pin 82a of the interconnecting rod 82, and at the other end the knob 7 is fixed. The lever 83 is adapted to be semi-fixed in any requested rotating position. Numeral 85 represents a fly wheel being rotatably mounted on the same shaft as the capstan 47 and between the fly wheel 85 and the motor pulley 65b a belt 86 is positioned. Numeral 87 represents a pulley being rotatably supported by a shaft 20i which is fixed on the base plate 20, and having in it a small pulley 87a. Between the pulley 87 and the motor pulley 65b, a belt 88 is positioned. Numeral 89 represents a supporting member having a width perpendicular to the direction of the paper surface, and being rotatably supported on the extension (backside direction of the drawing) of the shaft 20i so that it can be supported at the portion of both sides, and being given the nature of counter-clockwise rotation by a spring 90 and movable within a constant range. At the both sides of the free end of the supporting member 89, a shaft 91 is supported rotatably, and at the shaft 91 a pulley 92 is fixed, and a belt 93 is positioned between the pulley 92 and the pulley 87a. Numeral 94 represents a rotating roller being rotatably supported on the shaft 91. At the base plate 20, a not shown guide portion is prepared for the setting of the film cartridge 11.

Referring to FIGS. 7 and 8 showing the details of the cartridge 11, numeral 95 and 96 each represents an upper plate and a lower plate being interconnected at interconnecting portions 96a by a screw 97. A central interconnecting portion 96a works as a reel rotating shaft 96a. Numerals 98 and 99 represent an image projecting hole and a sound reproducing hole being penetrated through the upper plate 95 and the lower plate 96, respectively, and front surfaces of the holes are opened (arrow portion, hereinafter called "front surface"). Numeral 95a represents a slot formed from the front surface of the cartridge 11, numeral 95b represents an inserting portion for cam plate 100 for changing over the sound reproducing means, and the cam plate 100 is set detachable from the inserting portion 95b. Numeral 96c represents a projection being fixed on the upper plate 95, numeral 95d represents a bearing for a guide pin 101 being fixed on the upper plate 95, numeral 95e represents a spring member being fixed on the upper plate 95, numeral 95f represents a film guide portion being formed on the upper plate 95. Numeral 96b represents a recessed portion being prepared for the in and out motion of the rotating roller 94 when the cartridge 11 is set in the body case 1 of the projector. Numeral 102 represents a film reel being rotatably supported on a rotating shaft 96a', numeral 104 represents a pressure plate having holes and being located at the front opened portion of the image projecting hole and being pushed to the direction of the side wall of the cartridge 11 by a spring 105 positioned over the projection 95c. Numeral 106 represents a guide roller, numeral 107 represents a tension spring. Numeral 108 represents a retainer for fixing the one end portion of the film 13 in a film guide portion 95f being formed in the lower plate 96 of the cartridge 11.

Figure 9:
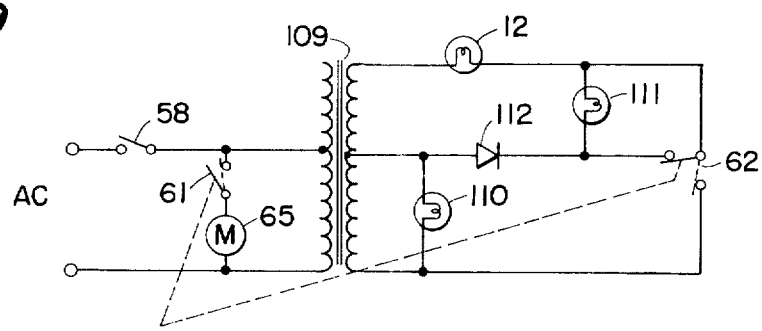
FIG. 9 shows a wiring diagram of a motor and lamp circuit.
Figure 10:
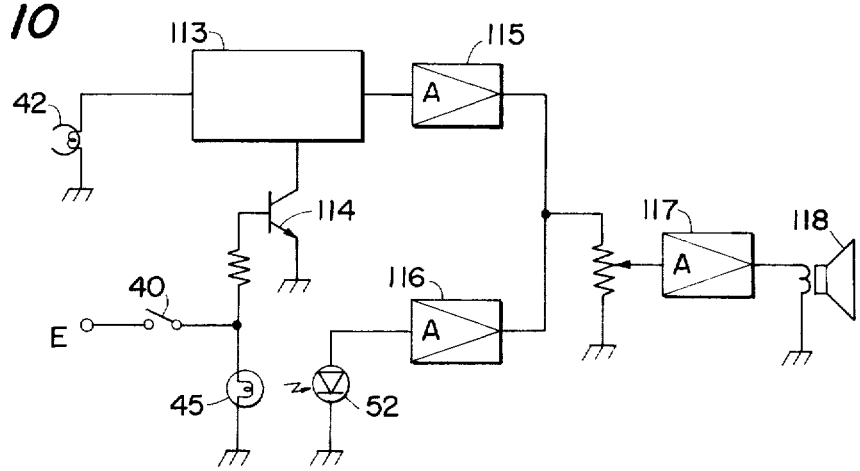
FIG. 10 shows a wiring diagram of a sound reproducing circuit.

FIG. 9 shows the wiring of motor and lamp circuits, and to the primary winding of a transformer 109 the power source switch 58, motor switch 61 and motor 65 are connected, and to the secondary winding a pilot lamp 110. The power source is connected to the projector and to the projecting lamp 12 through the change-over switch 62 and an indicating lamp 111. Numeral 112 represents a diode. FIG. 10 shows a block figure for the sound reproducing means, numeral 113 represents an input circuit to which a transistor 114 is connected for short-circuiting the signal from the magnetic head 42. To the base electrode of the transistor 114 and the exciter lamp 45, D.C. power source E is connected through the change-over switch 40. Numerals 115, 116 and 117 represent signal amplifying circuits, respectively, and numeral 118 represents a speaker.

Description will hereunder be made of the functions of the present invention having the aforesaid arrangement.

As shown in FIG. 1, when the cartridge 11 is set in the body case 1 it occupies the position as shown by the one-dot chain line in FIG. 3 and is supported in the position by a click member not shown. Upon setting the cartridge 11, the shaft 91 is moved to the clockwise direction around the shaft 20i against the spring 90, and the rotating roller 94 contacting to the lower surface of the cartridge 11 works as a guide roller. After the setting of the cartridge, as shown in FIG. 7, the roller 94 falls in the recessed portion 96b of the cartridge 11 by the action of the spring 90 and contacts to the outside face of the reel 102 and rotates the reel 102 upon the rotation of the motor 65. At the final stage of setting the cartridge 11, the arm 49a being protruded from the base plate 49 of the sound reproducing means 48 engages to the front surface of the cartridge 11 and thereby the means 48 is rotated clockwise around the shaft 50 from the position of FIG. 3 against the spring 51 and penetrates into the hole 99 for sound reproducing of the cartridge 11 through the hole 20d of the base plate 20 and is set to the pre-determined position faced to the sound reproducing device 41. On the other hand, against the sound track of the film 13 the magnetic head 42 and lens system 43 are faced, and on the optical axis of the lens system 43 the photoelectric converting element 52 is placed. For instance, in case of the inserted film 13 having an optical sound track, as shown in FIG. 7, since the cam plate 100 is set in the inserting portion 95b beforehand, the detecting pin 38c of the change-over lever 38 engages to the cam plate 100 and makes the lever 38 rotate to counter-clockwise direction from the position of FIG. 3 upon setting the cartridge 11. Accordingly, in this case, the arm 38b of the lever 38 is engaged to the pad supporting plate 54 (the arrow position of FIG. 5) and makes the plate 54 rotate to a direction so that it is apart from the magnetic head 42 against the spring 55, and in this case the film 13 is made free from the magnetic head 42. At the same time, in this case, as the arm 39a of the lever 38 engages the change-over switch 40 to change over the switch, the switch 40 of the sound reproducing circuit as shown in FIG. 10 is closed. At the time, in the circuits, some voltages are supplied to the exciter lamp 45 to light up the same, and also to the base electrode of the transistor 114 some voltages are supplied and makes the transistor 114 be conductive, so that the output terminal of the magnetic head 42 is shorted through the input circuit 113 and the magnetic reproducing circuit is made uneffective and only the optical reproducing circuit works to reproduce a sound through the speaker 118. Accordingly, in case of reproducing a sound by means of the optical system, there occurs no noise in the magnetic circuit. In case, the inserted film 13 has a magnetic sound track, as the cam plate 100 is not set in the inserting portion 95b, the change-over lever 38 does not make any rotation but rests at the position of FIG. 3 upon setting of the cartridge 11 into the body case 1, so that, in the magnetic reproducing, the switch 40 is made open as shown in FIG. 10 and the exciter lamp 45 does not light up (this means the optical reproducing circuit does not work) and the transistor 114 is made completely shut off to issue the sound reproducing signal without short-circuiting the output of the head 42.

At the final stage, upon setting the cartridge 11 in the body case 1, the operating lever 59 engages with the cartridge 11 by its one arm and rotates to counter-clockwise direction from the position of FIG. 3, and the other arm engages with the power source switch 58 and makes it close down. By the means taken as above, in the lamp circuit shown in FIG. 9, the pilot lamp 110 being connected to the secondary winding of the transformer 109 lights up and also the projecting lamp 12 lights up. The above mentioned operations and works are done through setting the cartridge 11 to the body case 1, and in this condition, when the operating knob 5 is moved upwards from the position of FIG. 3, the operating lever 22 rotates counter-clockwise direction from the position of FIG. 3 through the operating plate 21. As the bent portion of the arm 22c of the lever 22 engages with the bent portion of the arm 24a of the interlocking lever 24 by the spring 26, the interlocking lever 24 rotates to the counter-clockwise direction against the spring 25 at the same time when the lever 22 rotates to the counter-clockwise direction.

At the final stage in this counter-clockwise rotation, as the arm 24b of the lever 24 pushes the bent portion of the arm 33b of the lock lever 33, the lever 33 rotates to clockwise direction against the spring 34 and in the process of it the bent portion of the arm 24b of the lever 24 penetrates inside the bent portion of the arm 33a of the lever 33. In this time, the bent portion of the arm 33c of the lever 33 is put on the cam plate 36a of the loop detecting member 36. Upon releasing the pushing up power of the knob 5, the lever 24 is meant to make clockwise rotation by the spring 25, but the counter-clockwise rotation of the lever 33 is stopped due to the bent portion of the arm 33c being put on the cam plate 36a, so that the bent portions of the arms 33a and 24b engage each other and the lever 24 is locked to the counter-clockwise rotated position. At the same time in this procedure, as the operating pin 24d of the lever 24 moves downwards pushing the plate spring 30, the lens block supporting plate 27 makes counter-clockwise rotation against the spring 29 in FIG. 6 and the lever 24 being at the locked position makes the lens block 14 penetrate into the image projecting hole of the cartridge 11 through the hole 20b and also makes it fix on the path of the projecting light to be emitted from the projecting lamp 12.

At the same time, on the other hand, the operating lever 63 makes counter-clockwise rotation through the interconnecting wire 64 and at that time, within the moving path of the arm 63c is placed the engaging portion 56b of the pressure plate 56 of the sound reproducing means 48 which is placed at the rotated position by the cartridge 11, so that the arm 63c pushes the engaging portion 56b and the operating plate 56 tensions the spring 57. By this procudure, the film 13 is completely pressured to the capstan 47 by the pinch roller 53. (In the magnetic sound system, the spring pressure is added to the pad 54a so as to contact the sound track of the film 13 to the head 42.)

Further at the same time, as the bent portion of the arm 63b of the lever 63 operates the motor switch 61 and the lamp circuit changing-over switch 62 interlocking each other, the motor switch 61 shown in FIG. 9 is closed and along with rotating the motor 65 the lamp circuit and the switch 62 are changed over from the position of the solid line to the position of dotted line in FIG. 9. By this operation, the short circuit of the operation indicating lamp 111 is taken off and the lamp 111 is lit up and also the projecting lamp 12 is lit up to project along with lighting the lamp indicating portion 4 of FIG. 1. Through the procedurs as above, when the motor is rotated, the shutter shaft 67 is rotated through the belt 70 and also the well-known shutter blade 69, the feeding cam 72 and the control cam 73 are rotated integrally. In this time, as the other end of the interlocking wire 77 is made free from the bent portion of the arm 22b by the counter-clockwise rotation of the lever 22 (the engagement of the bent portion of the arm 22b and the interlocking wire 77 is made so as to give a tension to the wire 77 when the lever 22 is placed at the position of FIG. 3, and is made so as to give a sliding movement to the wire 77 when the lever 22 is rotated to the counter-clockwise direction.), the operating plate 76 moves to right and left in the FIG. 3 around the pin 20h in obedience with the movement of the control cam 73, and the feeding plate 78 is made the up and down movement about the shaft 79a of the intermediate plate 79 in obedience with the feeding cam 72 (refer to FIG. 4). The obeying movement of the both operating plates 76, 78 to the both cams 73, 72 is transmitted to the feeding claw member 74 through the pin 76c and the interlocking wire 80 by the spring 75. By this procedure, the claw 74a feeds the film 13 by engaging and detaching to the perforation of the film 13 in the cartridge 11.

By moving the frame control knob 7 upwards or downwards, it is possible to change the pivot position (the shaft 79a) of the feeding plate 78 through the frame control lever 83, the interconnecting rod 82 and the intermediate plate 79. Therefore, the position of up and down motion of the pawl 74a is changed, and then it is possible to coincide a frame of the film with the aperture.

By the procedures mentioned above, the film 13 is fed. The light from the projecting lamp 12 reaches to the screen 2 through the aperture 31, the film 13 and the lens block 14 and being reflected by the mirrors 15, 16 and 17, and thus the picture of the film 13 is projected on the screen 2. On the other hand, after the intermittently feeding film 13 being positioned over the end of the detecting element 36b of the detecting member 36, it is fed in constant speed by the capstan 47, and the sound reproducing works as mentioned above is made upon passing through the portion of the sound reproducing device 41.

As the loop detecting member 36 is given the power of counter-clockwise rotation by a spring not shown being connecting to the speed control member 71 through the arms 71a and 36c, the detecting element 36b works to push the film 13 inside the cartridge 11 and penetrate into the slot 95a forming the loop in the film (refer to FIG. 7). Namely, the balance of feeding speeds by the claw 74a and by the capstan 47, the loop increase or decrease and makes the detecting element 36b move.

By this operation, the speed control member 71 rotates around the shutter shaft 67 through the arms 36c, 71a, and the pulley 71c controls the tension of the belt 70 between the pulley 65b and the pulley 68 by tighting or releasing the belt 70 through the arm 71b, and further controls the rotation of the shutter shaft 67, viz., controls the feeding speed of the film 13 by the claw 74a.

Thus, when finished with the projection of one roll film, if the perforation of the film 13 is preliminary cut off, the feeding of the film 13 is made without the aid of the claw 74a and only by the capstan 47, so that the film 13 in the part of the detecting element 36b of the loop detecting member 36 tightens and pushes out the detecting element 36b outside the cartridge 11. Accordingly, the member 36 rotates to the clockwise direction and makes the cam plate 36a rotate to the clockwise direction, since the best portion of the arm 33c of the lock lever 33 being put on the plate 36a detaches from the cam plate 36a, and by the work of the spring 34 the lock lever 33 rotates to the conterclockwise direction and returns to the position of FIG. 3. In this time, as the locking of the interlocking lever 24 is released, the knob 5 is returned to the position of FIG. 3 along with the lever 24. By the operation as the above, the concerned elements return to the position of FIG. 3 and each element returns to the condition when the cartridge 11 is set.

When required to stop the projection in the interim, it is necessary to push down the operating knob 5 from the moved position to the position of FIG. 3. By this pushing down of the operating knob 5, the operating lever 22 rotates to the clockwise direction against the spring 26, and at the same time as the claw 74a is detached from the film 13 through the interconnecting wire 77 and the operating plate 76, the feeding of the film 13 by the claw 74a stops and on the detecting element 36b the tightened film 13 works and the same operations as mentioned above are made, and stops the projection, and each element returns to the condition when the cartridge 11 is set.

The mechanism concerned with the focussing knob comprises such well-known means as engaging the lens block 14 to an interconnecting rod which engages with a spiral cam slot, and by rotating the knob 6, moves the interconnecting rod forward or backward along the lens axis. For a variable resistor being operated by the volume adjusting knob 8, that of the slide type is favourable.

Figure 11:
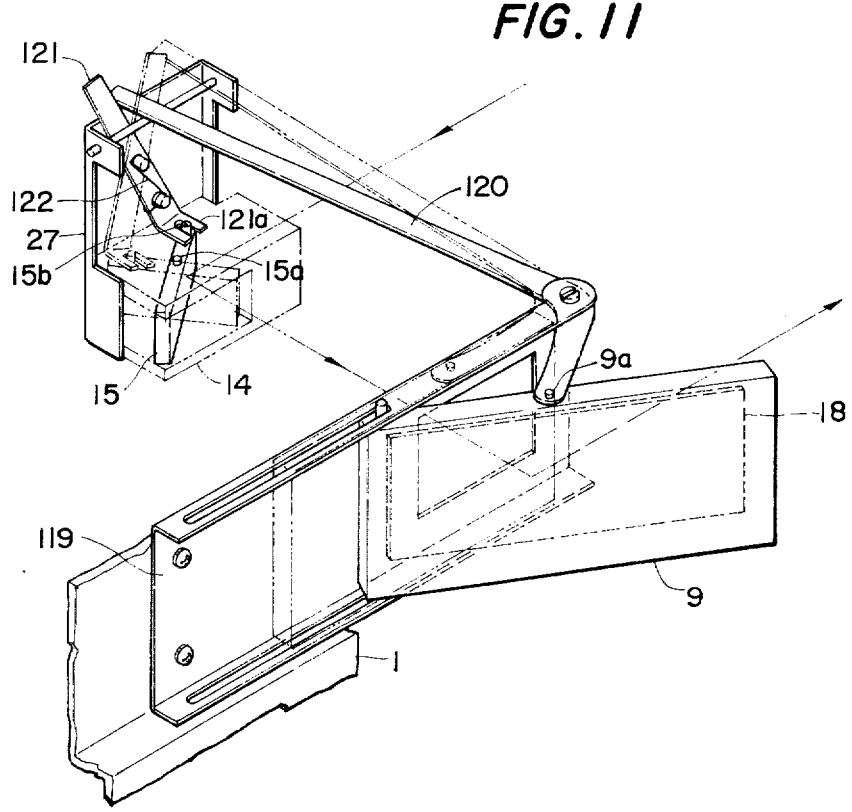
FIG. 11 shows a partially enlarged perspective view illustrating an example of the interlocking relation between a rotatable reflecting mirror and a door.

The reflecting mirror 15 being built in the lens block 14 is arranged so as to rotate around the shaft 15a, so that, if the mirror 15 is rotated to the position shown by dotted line in FIG. 2 and opens the door 9 as shown, with the reflecting mirror 18 positioned to it, the picture of the film 13 is connected to outside the projector, and in this case the picture is projected on the external screen 19. FIG. 11 shows an enlarged perspective view illustrating an example of the interlocking relation between the rotatable reflecting mirror 15 and the door 9, and in this embodiment, the door 9 is supported by a guide plate 119 being secured to the body case 1. An interconnecting lever 120 being rotatably supported on the guide plate 119 rotatably supports at its one end the door 9 through a pin 9a which is fixed at the center of the upper edge of the door 9. The other end of the interconnecting lever 120 is engaged with the side edge of a lever 121 being rotatably supported on the lens block fixing plate 27. On one end of the lever 121, a fork-shaped portion 121a is formed which engages with a pin 15b being fixed at the upper end of the rotatable reflecting mirror 15. The lever 121 is biased to the clockwise direction by a spring 122. FIG. 11 shows a state of projecting a picture of the film 13 on the screen 19 which is placed at outside the projector by opening the door 9. In this state, if the door 9 is closed as shown by two-dots chain line, the interconnecting lever 120 rotates to the clockwise direction up to the position shown by two-dots chain line. Accordingly, the lever 121 rotates to the clockwise direction by the spring 122 to the position shown by two-dots chain line, and the rotatable reflecting mirror 15 rotates to the counter-clockwise direction around the shaft 15a to the position shown by two-dots chain line. Therefore, when the door 9 is closed, the picture of the film 13 is projected on the screen 2.

The spring for the clockwise rotation of the changeover lever 38 is not always necessary, and for the sound reproducing device, it is effective to provide a guide pin to get a constant running position of the film for the optical sound reproducing and to give a space between the magnetic head 42 and the film 13.

According to the present invention, as mentioned above, for cartridge type sound projector, it is possible to use the cartridge contained the optical or magnetic sound film, and as the selection system is set in the cartridge side preliminary, the reproducing means are selected automatically in accordance with the sound system of the film to be used. If selecting the optical sound system, the magnetic head circuit is short-circuited, so that there occurs only a small noise.

I claim:

1. An audio-visual projector comprising a body case, a guide portion formed in said body case, optical and magnetic sound reproducing means positioned adjacent to said guide portion and being selectively movable to a working position by the setting operation of said film cartridge, optical and magnetic sound reproducing circuits connected to said optical and magnetic sound reproducing means, respectively, a projection lamp positioned adjacent to said guide portion, a lamp circuit included in said body case to control the lighting of said projection lamp, a lens block positioned adjacent to said guide portion and being movable into the light path of said projection lamp, and a screen positioned on one side wall of said body case and being receivable of the light from said projection lamp through said lens block, said magnetic sound reproducing circuit containing a magnetic head, an input circuit connected to said magnetic head, and a transistor having the collector electrode connected to said input circuit, and when said optical sound reproducing means is moved to its working position, both terminals of said magnetic head are short-circuited through said input circuit and said transistor.

2. An audio-visual projector comprising a body case, a guide portion formed in said body case, optical and magnetic sound reproducing means positioned adjacent to said guide portion and being selectively movable to a working position by the setting operation of said film cartridge, optical and magnetic sound reproducing circuits connected to said optical and magnetic sound reproducing means, respectively, a projection lamp positioned adjacent to said guide portion, a lamp circuit included in said body case to control the lighting of said projection lamp, a lens block positioned adjacent to said guide portion and being movable into the light path of said projection lamp, and a screen positioned on one side wall of said body case and being receivable of the light from said projection lamp through said lens block, said lamp circuit comprising a power source switch, a transformer connected to said power source switch, and a change-over switch connected to one terminal of said projection lamp of which the other terminal is connected to one terminal of a secondary winding of said transformer to connect said one terminal of said projection lamp to any one of the intermediate terminal and the other terminal of said secondary winding, whereby when said power source switch is closed said projection lamp is lit up preliminarily.

3. An audio-visual projector comprising a body case, a guide portion formed in said body case, optical and magnetic sound reproducing means positioned adjacent to said guide portion and being selectively movable to a working position by the setting operation of said film cartridge, optical and magnetic sound reproducing circuits connected to said optical and magnetic sound reproducing means, respectively, a projection lamp positioned adjacent to said guide portion, a lamp circuit included in said body case to control the lighting of said projection lamp, a lens block positioned adjacent to said guide portion and being movable into the light path of said projection lamp, and a screen positioned on one side wall of said body case and being receivable of the light from said projection lamp through said lens block, said projector further comprising an interlocking lever manually operable and engageable with a supporting plate supporting said lens block, a lock lever engageable with said interlocking lever, and a film loop detecting member engaged with said lock lever and engageable with the film housed in said film cartridge, and when said interlocking lever is manually operated said interlocking lever is locked by said film loop detecting member through said lock lever, and further when said detecting member is moved by the film said interlocking lever is released by the movement of said detecting member.

4. An audio-visual projector comprising a body case, a guide portion formed in said body case, optical and magnetic sound reproducing means positioned adjacent to said guide portion and being selectively movable to a working position by the setting operation of said film cartridge, optical and magnetic sound reproducing circuits connected to said optical and magnetic sound reproducing means, respectively, a projection lamp positioned adjacent to said guide portion, a lamp circuit included in said body case to control the lighting of said projection lamp, a lens block positioned adjacent to said guide portion and being movable into the light path of said projection lamp, and a screen positioned on one side wall of said body case and being receivable of the light from said projection lamp through said lens block, said lens block containing a first reflecting mirror rotatably supported in said lens block, and said projector further comprising a door having a second reflecting mirror thereon and arranged so as to open and close on a side wall of said body case and capable of rotating said first reflecting mirror, and when said door is opened the light from said projection lamp is led to the outside of said body case through said first and second reflecting mirrors.

* * * * *